(12) United States Patent
Han

(10) Patent No.: US 9,495,003 B2
(45) Date of Patent: Nov. 15, 2016

(54) SERVER STORING DATA AND CONTROL INFORMATION FOR REPOWERING OPERATION

(71) Applicants: Inventec (Pudong) Technology Corporation, Shanghai (CN); INVENTEC CORPORATION, Taipei (TW)

(72) Inventor: Ying-xian Han, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 91 days.

(21) Appl. No.: 14/583,419

(22) Filed: Dec. 26, 2014

(65) Prior Publication Data

US 2016/0124494 A1    May 5, 2016

(30) Foreign Application Priority Data

Oct. 29, 2014 (CN) .......................... 2014 1 0597198

(51) Int. Cl.
*G06F 1/32* (2006.01)

(52) U.S. Cl.
CPC .................. *G06F 1/3296* (2013.01)

(58) Field of Classification Search
CPC ........................ G06F 1/263; G06F 11/1402
See application file for complete search history.

(56) References Cited

U.S. PATENT DOCUMENTS

| | | | |
|---|---|---|---|
| 2007/0094446 A1* | 4/2007 | Sone ........................ | G06F 1/263 711/113 |
| 2013/0283069 A1* | 10/2013 | Matsuda ................... | G06F 1/26 713/300 |

* cited by examiner

*Primary Examiner* — Albert Wang
(74) *Attorney, Agent, or Firm* — Muncy, Geissler, Olds & Lowe, P.C.

(57) ABSTRACT

A server includes a control module, a power-supply unit, a storage unit and a switch unit. The control module is electrically connected to a storage device. When the server is powered on, a first power is transmitted to from the power-supply unit to the storage unit and the switch unit, and received by the switch unit to generate a third power. When the server is powered off, the storage unit is triggered to transmit a second power to the switch to make the switch transmit the third power. The control module is provided to control a transmission information between the storage device and a buffer of the control module. When the server is powered on again, the control module continually works according to the transmission information stored in the buffer.

6 Claims, 2 Drawing Sheets

SERVER STORING DATA AND CONTROL INFORMATION FOR REPOWERING OPERATION

FIELD OF THE INVENTION

The present invention is related to a server, and more particularly related to a server which is powered by the power management unit when being powered off such that the server can keep storing data.

BACKGROUND OF THE INVENTION

Attending with the progress of technology, the development of network has lead to a life full of electronic devices. Server is the demanded apparatus for establishing a network. In general, the servers nowadays are also responsible to backup data. As the server is powered off, it is needed to use the backup power in order to continue the backup process. However, the amount of data storage is quite enormous in present, the provided backup power might not be sufficient to cover the execution of the backup process without a good power management system. Thus, the data might not be backed up properly and there exists the need to improve the technology in present.

BRIEF SUMMARY OF INVENTION

In view of the poor power management efficiency of the server nowadays, which leads to the common problem of data backup, a server is provided in the present invention. The server charges a storage unit as the server is powered on and the storage unit can be triggered to supply power as the server is powered off such that the problem can be resolved.

According to the above mentioned object, a server is provided in accordance with an embodiment of the present invention. The server comprises a control module, a power-supply unit, a storage unit, and a switch unit. The control module is electrically connected to a storage device for controlling the storage device. The control module includes a high-speed buffer, which is utilized for storing data and control information of the storage device and the control module. The power-supply unit is utilized for outputting a first power. The storage unit is electrically connected to the power-supply unit for receiving the first power and outputting a second power. The switch unit is electrically connected to the power-supply unit, the storage unit, and the control module, for receiving the first power and the second power and outputting a third power to charge the control module. The switch unit also isolates the first power from the second power to prevent leaky current;

Wherein, when the server is powered on, the first power is utilized to charge the storage unit and received by the switch unit to output the third power. When the server is powered off, the storage unit is triggered to output the second power, and the switch unit receives the second power and outputs the third power. The control module is utilized to control the high-speed buffer to store the data and the control information of the storage device and the control module, and when the server is powered on again, the control module continually works according to the data and the control information stored in the high-speed buffer.

In accordance with a preferred embodiment of the present invention, the server further comprises a connector. The storage unit is electrically connected to the connector and further electrically connected to the power-supply unit and the switch unit through the connector such that the storage unit can support plug-in/pull-out operation through the connector. In addition, as a preferred embodiment, the storage unit can be a multiple cell module. Moreover, in accordance with a preferred embodiment of the present invention, the storage unit comprises a battery management module, an input power management module, an output power management module, and a battery module. The battery management module is utilized for managing charging and discharging of the storage unit. The input power management module is utilized for managing amount of power supplied from the first power to the storage unit so as to prevent overcharge. The output power management module is controlled by the battery management module to turn on or cut off the outputted second power. The battery module is utilized for storing power.

In accordance with a preferred embodiment of the present invention, when the server is powered on, the battery management module controls the charging from the first power to the battery set based on amount of power stored in the battery set and monitors temperature of the battery set, and when the server is powered off, the battery management module turns on the output power management module to output the second power based on a storage unit trigger signal. The storage unit trigger signal is disabled when the server is powered on, and is enabled when the server is powered off. In addition, the server further comprises a baseboard management controller (BMC), which is electrically connected to the storage unit, wherein the battery management module detects the temperature of the battery set to access a temperature information and transmits the temperature information to the baseboard management controller by using a transmission signal, and the baseboard management controller controls the battery management module based on the transmission signal. In addition, when the storage unit is plugged in by using the connector, the storage unit transmits a storage unit plugged-in enable signal to the baseboard management controller to facilitate the baseboard management controller to monitor status of the storage unit.

By using the technology provided in accordance with the present invention, because the storage unit is charged when the server is powered on and would be started to supply electric power when the server is powered off, the backup process can be continued even when the server is powered off.

In addition, because the storage unit can be a multiple cell module in accordance with an embodiment of the present invention, the storage unit is capable to continually supply electric power to cover the execution of the backup process even when the server is powered off and there is a huge amount of data needed to be backed up.

The embodiments adopted in the present invention would be further discussed by using the flowing paragraph and the figures for a better understanding.

DETAILED DESCRIPTION OF THE INVENTION

There are various embodiments of the server provided in accordance with the present invention, which are not repeated hereby. Only a preferred embodiment is mentioned in the following paragraph as an example.

Figure 1:
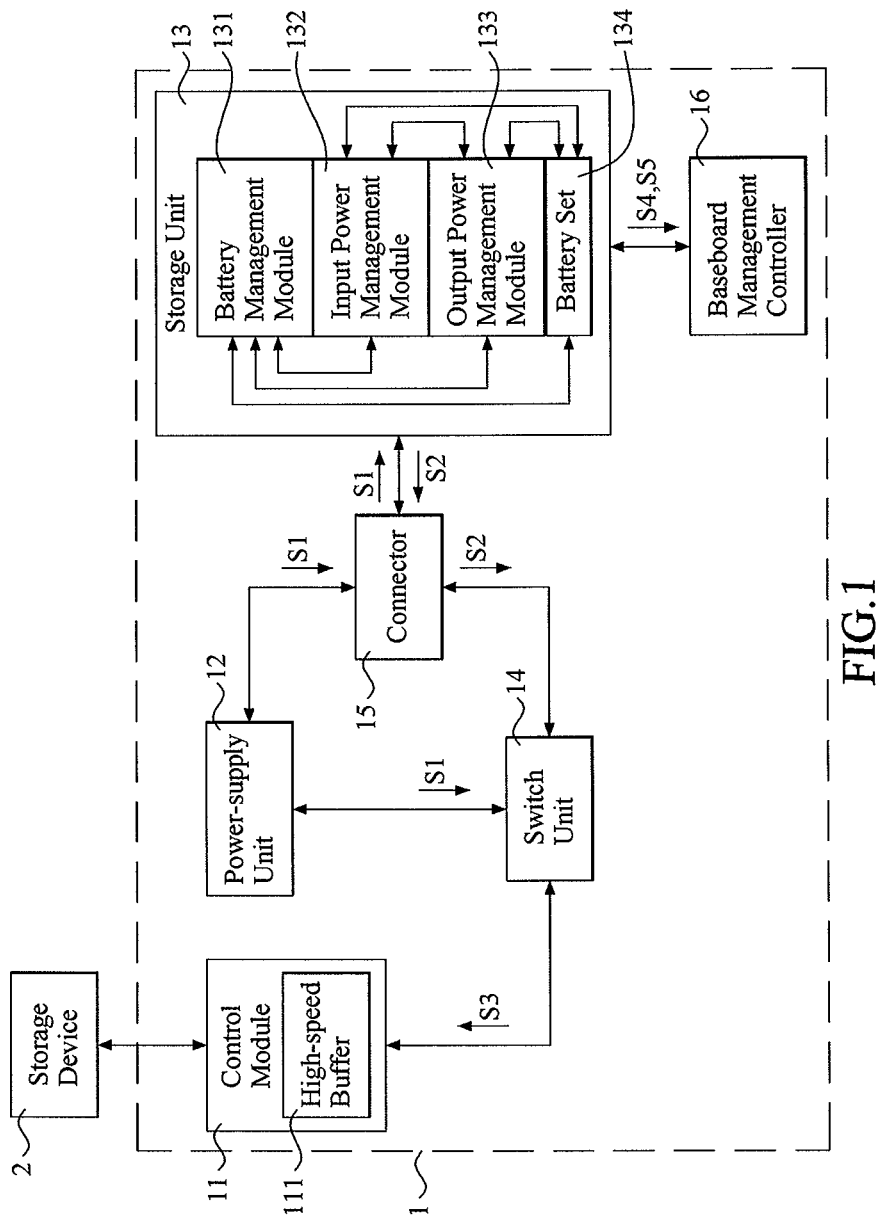
FIG. 1 is a block diagram showing a server provided in accordance with a preferred embodiment of the present invention.
Figure 2:
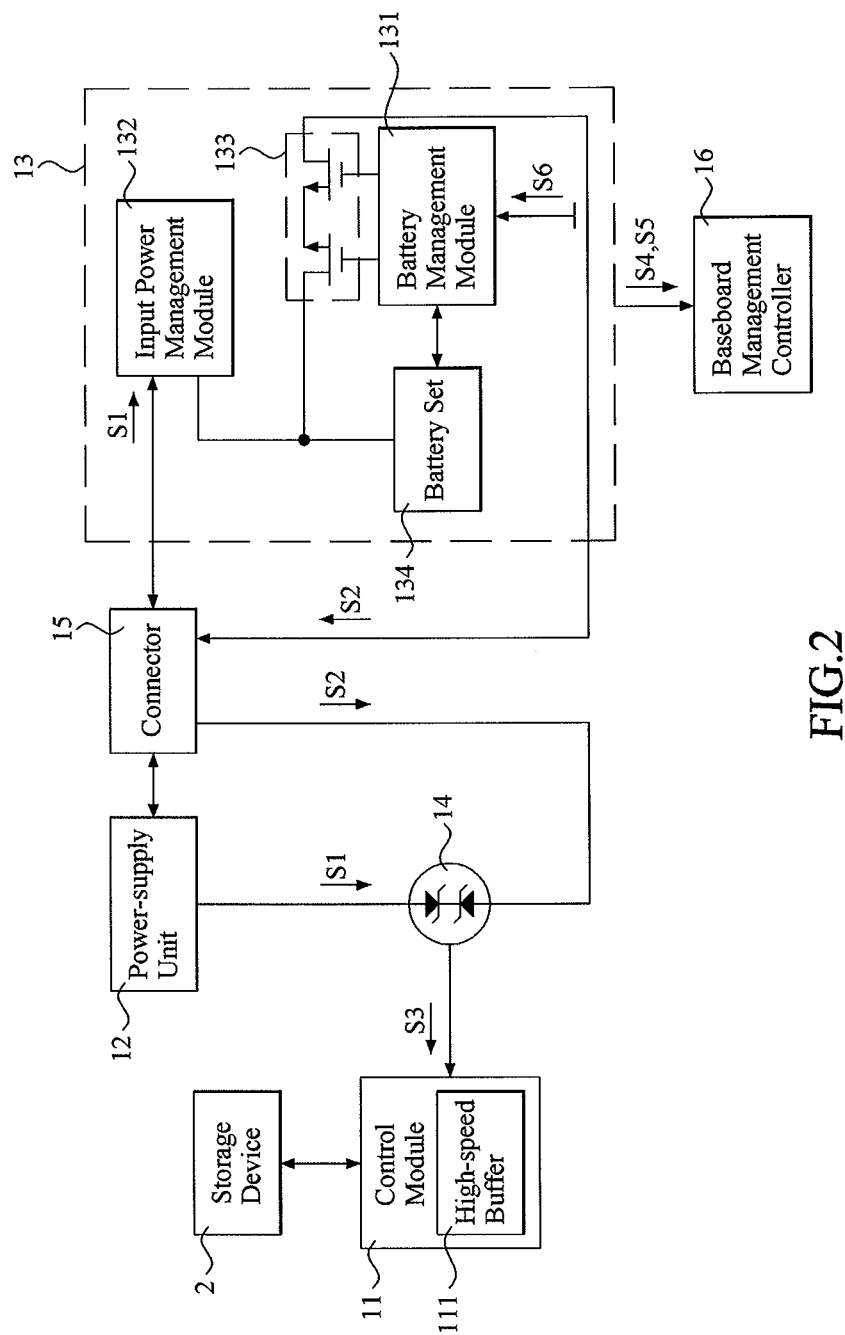
FIG. 2 is a schematic view showing the circuitry of the storage unit and the switch unit in accordance with the preferred embodiment of the present invention.

Please refer to FIG. 1 and FIG. 2, wherein FIG. 1 is a block diagram showing a server provided in accordance with a preferred embodiment of the present invention and FIG. 2 is a schematic view showing the circuitry of the storage unit and the switch unit in accordance with a preferred embodiment of the present invention. As shown, the server 1 provided in accordance with a preferred embodiment of the present invention includes a control module 11, a power-supply unit 12, a storage unit 13, a switch unit 14, a connector 15, and a baseboard management controller (BMC) 16.

The control module 11 can be provided on a flash card or a secure digital (SD) card for example, however, the present invention is not so restricted. The control module 11 is electrically connected to a storage device 2, such as a hard drive. However, the present invention is not so restricted. In the other embodiment, the other devices with data storing ability can be used to replace the hard drive. In addition, the control module 11 includes a high-speed buffer 111. The high-speed buffer 111 can be a flash memory in the control module 11. However, the present invention is not so restricted. The power-supply unit 12 can be the Power Supply Unit (PSU) of the computer. However, the present invention is not so restricted.

The storage unit 13, such as a multiple cell module, is electrically connected to the power-supply unit 12. Concretely speaking, the storage unit 13 includes a battery management module 131, an input power management module 132, an output power management module 133, and a battery set 134 (there might be multiple battery sets in accordance with the other embodiments of the present invention). The battery management module 131 can be a processor with signal processing capability, the input power management module 132 is electrically connected to the power-supply unit 12, and the output power management module 133 is electrically connected to the input power management module 132 and the battery management module 131. The output power management module 133 may be composed of two transistors (not labeled in the figures). The battery set 134 is electrically connected to the battery management module 131, the input power management module 132, and the output power management module 133.

The switch unit 14 is electrically connected to the control module 11, the power-supply unit 12, and the storage unit 13. The switch unit 14 can be a switch composed of two transistors.

The connector 15 can be the sort of connectors with a plug and a socket, such as the connectors of universal serial bus (USB) interface and serial peripheral interface (SPI). However, the present invention is not so restricted. The connector 15 is electrically connected to the storage unit 13, the power-supply unit 12, and the switch unit 14. That is, the storage unit 13 is electrically connected to the power-supply unit 12 and the switch unit 14 through the connector 15 such that the storage unit 13 can support the plug-in/pull-out operation through the connector 15.

The baseboard management controller (BMC) 16 is electrically connected to the storage unit 13. As a preferred embodiment, the BMC 16 may be electrically connected to the battery management module 131.

The control module 11 is utilized to control the storage device 2. The high-speed buffer 111 is utilized to store data and control information of the storage device 2 and the control module 11, such as the transmission information between the storage device 2 and the control module 11. The power-supply unit 12 is capable to output a first power S1, which can be the commercial power. The storage unit 13 receives the first power S1 and outputs a second power S2. The switch unit 14 receives the first power S1 and the second power S2 to output a third power S3. The third power S3 is supplied to the control module 11. The switch unit 14 also isolates the first power S1 from the second power S2 to prevent leaky current (as shown in FIG. 2).

In addition, the battery management module 131 is utilized for managing charging and discharging of the storage unit 13. The input power management module 132 is utilized for managing amount of power supplied from the first power S1 to the storage unit 13 so as to prevent overcharge. The output power management module 133 is controlled by the battery management module 131 to turn on or cut off the outputted second power S2. The battery module 134 is utilized for storing the electric power provided from the first power S1.

When the server 1 is powered on, the first power S1 is supplied to the storage unit 13 so as to charge the storage unit 13. Meanwhile, the switch unit 14 also receives the first power S1 and outputs the third power S3 such that the control module 11 can store data and control information of the storage device 2 and the control module 11 by using the third power S3.

In addition, when the storage unit 13 is plugged in by using the connector 15, the storage unit 13 transmits a storage unit plugged-in enable signal S4 to the baseboard management controller 16 to facilitate the baseboard management controller 16 to monitor the status of the storage unit 13. That is, when the server 1 is powered on, the battery management module 131 controls the charging from the first power S1 to the battery set 134 based on the amount of power stored in the battery set 134, and also detects the temperature of the battery set 134. Concretely speaking, the battery management module 131 detects the temperature of the battery set 134 to access a temperature information and transmits the temperature information to the baseboard management controller 16 by using a transmission signal S5, and the baseboard management controller 16 controls the battery management module 131 based on the temperature information of the transmission signal S5. That is, the baseboard management controller 16 is utilized to prevent the temperature of the battery set 134 controlled by the battery management module 131 from exceeding the limit.

In addition, when the server 1 is powered off (also refer to the condition the power is interrupted), the storage unit 13 is started and outputs the second power S2 (i.e. the electric power stored in the battery set 134) through the connector 15. Furthermore, the battery management module 13 controls the output power management module 133 to output the second power S2 based on a storage unit enable signal S6. The switch unit 14 receives the second power S2 and outputs the third power S3. The control module 11 controls the high-speed buffer 111 to store (or backup) the data and control information of the storage device 2 and the control module 11. When the server 1 is powered on again, the control module 11 retrieves the work by using the information stored in the high-speed buffer 111.

Moreover, the storage unit enable signal S6 is disabled when the server 1 is powered on, but enabled when the server 1 is powered off. Concretely speaking, the storage unit enable signal S6 can be enhanced to the level of the first power S1 by using a resistor (not shown in this figure), such that the storage unit enable single S6 can be in the enable state (active low) when the first power S1 is shut down. In addition, the storage unit enable signal S6 may be controlled by the power-good signal (not shown) outputted from the power-supply unit 12. For example, when the power-good signal is enabled, the storage unit enable signal S6 would be set as disable, and when the power good signal is disabled, the storage unit enable signal S6 would be set as enable. Such storage unit enable signal S6 can be implemented by using a logic negative element (such as an inverter).

In conclusion, by using the technology provided in accordance with the present invention, because the storage unit is charged when the server is powered on and would be started to supply electric power when the server is powered off, thus, the backup process can be continued even when the server is powered off and the work can be retrieved when the server is powered on again. In addition, because the storage unit is a multiple cell module in accordance with an embodiment of the present invention, the storage unit is capable to continually supply electric power to cover the execution of the backup process.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A server, comprising:
    a control module, electrically connected to a storage device for controlling the storage device, and the control module comprising:
        a high-speed buffer, utilized for storing data and control information of the storage device and the control module;
    a power-supply unit, outputting a first power;
    a storage unit, electrically connected to the power-supply unit for receiving the first power and outputting a second power and comprising:
        a battery management module, utilized for managing charging and discharging of the storage unit;
        an input power management module, utilized for managing amount of power supplied from the first power to the storage unit so as to prevent overcharge;
        an output power management module, controlled by the battery management module to turn on or cut off the outputted second power; and
        a battery module, utilized for storing power;
    a switch unit, electrically connected to the power-supply unit, the storage unit, and the control module, for receiving the first power and the second power and outputting a third power to charge the control module, and the switch unit isolating the first power from the second power to prevent leaky current; and
    a connector, the storage unit being electrically connected to the connector and further electrically connected to the power-supply unit and the switch unit through the connector such that the storage unit supports plug-in/pull-out operation through the connector;
    wherein when the server is powered on, the battery management module controls the charging from the first power to the battery set based on amount of power stored in the battery set and monitors temperature of the battery set, and when the server is powered off, the battery management module turns on the output power management module to output the second power based on a storage unit trigger signal; and
    wherein when the server is powered on, the first power is utilized to charge the storage unit and received by the switch unit to output the third power, when the server is powered off, the storage unit is triggered to output the second power and the switch unit receives the second power and outputs the third power, the control module is utilized to control the high-speed buffer to store the data and the control information of the storage device and the control module, and when the server is powered on again, the control module continually works according to the data and the control information stored in the high-speed buffer.

2. The server of claim 1, wherein the storage unit is a multiple cell module.

3. The server of claim 1 wherein the storage unit trigger signal is disabled when the server is powered on, and is enabled when the server is powered off.

4. The server of claim 1, further comprising a baseboard management controller (BMC), electrically connected to the storage unit.

5. The server of claim 4, wherein the battery management module detects the temperature of the battery set to access a temperature information and transmits the temperature information to the baseboard management controller by using a transmission signal, and the baseboard management controller controls the battery management module based on the transmission signal.

6. The server of claim 4, wherein when the storage unit is plugged in by using the connector, the storage unit transmits a storage unit plugged-in enable signal to the baseboard management controller to facilitate the baseboard management controller to monitor status of the storage unit.

* * * * *